INVENTOR
GABRIEL L. GUINOT

INVENTOR
GABRIEL L. GUINOT

United States Patent Office 3,442,530
Patented May 6, 1969

3,442,530
METHOD OF OPERATING EXTENDABLE AND RETRACTABLE STABILISING STAYS OR PROPS OF PUBLIC WORKS VEHICLES AND AN HYDRAULIC SYSTEM FOR CARRYING OUT SAID METHOD
Gabriel L. Guinot, Le Plessis-Belleville, Oise, France
Filed Feb. 15, 1967, Ser. No. 616,334
Claims priority, application France, Mar. 22, 1966, 54,395
Int. Cl. B60s 9/10; F15b 15/00
U.S. Cl. 280—150.5                                   7 Claims

ABSTRACT OF THE DISCLOSURE

A hydraulic system for operating the extendable and contractible stabilising stays of a public works vehicle. At least two groups of stabilising stays are attached to double-acting hydraulic rams. The rams of one group are fed in parallel and each group is arranged to be fed independently of the other from a single source of pressure fluid through a single distributor. The supply conduit for the rams of one of the groups has two branch conduits, one of which is provided with a calibrated main valve which allows controlled supply of pressure fluid to said rams. The other branch conduit is provided with a non-return valve acting in the opposite direction to the calibrated main valve with which it is associated. The invention also includes the method of operating extendable and contractible stabilising stays of a public works or handling vehicle.

Figure 1:
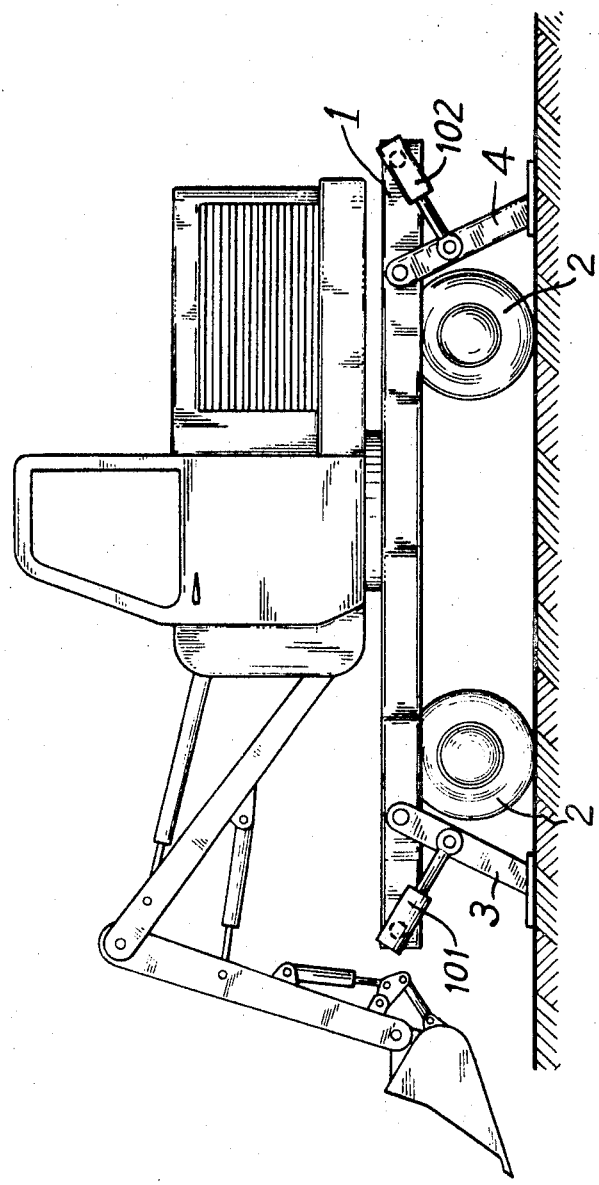

This invention relates to a method of operating extendable and retractable stabilising stays or props of public works vehicles and an hydraulic system for carrying out said method.

It is well known that some public works or handling vehicles can operate correctly only after they have been immobilised on the ground. For this purpose it has been proposed to provide such vehicles with movable stabilising members, generally known and hereinatfer referred to as stays which are arranged to bear on the ground and thus at least partly eliminate the effects of the suspension means with which the said vehicles are provided. These stays are mounted on the vehicle chassis, so as to define a polygon to support the vehicle in the operative position according to the specific vehicle stability problem, said polygon being of greater area in the operative position of the stays than in the inoperative position thereof.

The main functions of the stabilising stays are to counteract transverse and/or longitudinal oscillations of the vehicle due to the flexibility of the suspension means, and to counteract longitudinal and/or transverse displacements due to forces originating from the operating implements or any other extraneous causes.

The systems at present known for these stabilisation problems have various disadvantages. More particularly, if the ground is very uneven, the stays are not all always in contact with the ground and some of them then consequently take abnormal forces. Stability is thus jeopardised and there is the danger of incidents or accidents during operation.

The object of the present invention therefore is to eliminate these disadvantages and with this object in view the invention consists of a method of operating extendable and contractible stabilising stays of a public works or handling vehicle, where at least two groups of stays are arranged to bear on the ground and are preferably disposed at each of the ends of the vehicle, wherein first the stays of one of the groups are fully extended, whereafter the stays of the other group are extended, the extension of said latter stays being stopped when all the stays of all groups bear on the ground, retraction being effected in reverse sequence to extension.

The invention further consists of an hydraulic system for carrying out the method wherein the stabilising stays are attached to double-acting hydraulic rams arranged in at least two groups, the rams of one group being fed with fluid in parallel and each group being adapted to be fed with fluid independently of the other from a single source of pressure fluid through a single distributor, wherein the supply conduit for the rams of one of the groups has two branch conduits, one of which is provided with a calibrated main valve through which the rams are supplied with pressure fluid, while the other is provided with a non-return valve acting in the opposite direction to the calibrated main valve with which it is associated.

Figure 2:
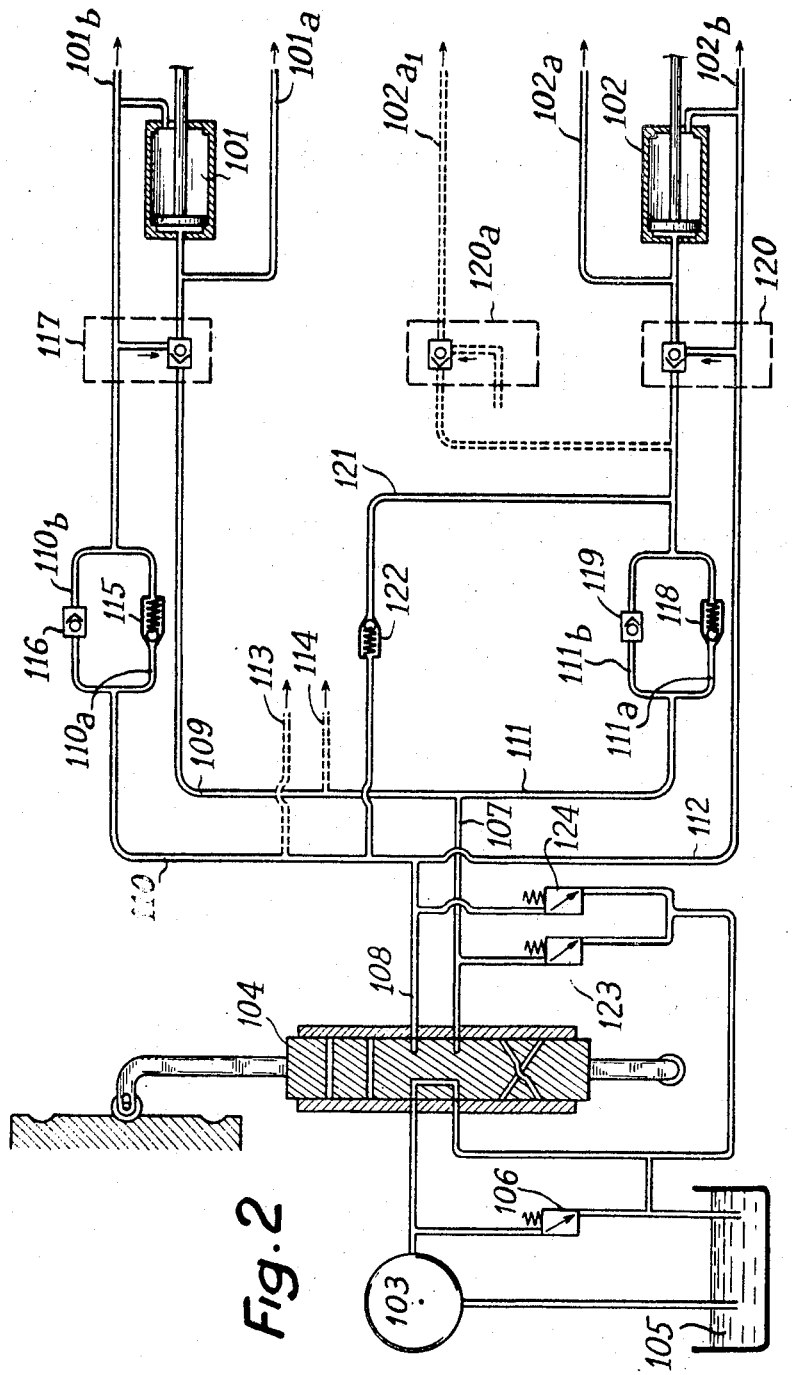
Figure 3:
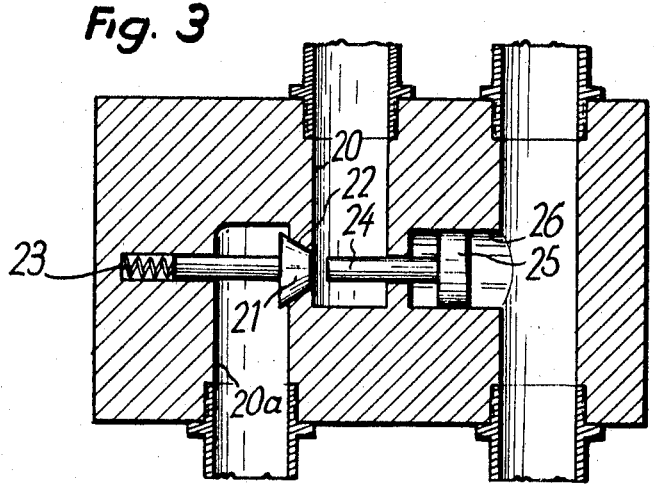
Figure 4:
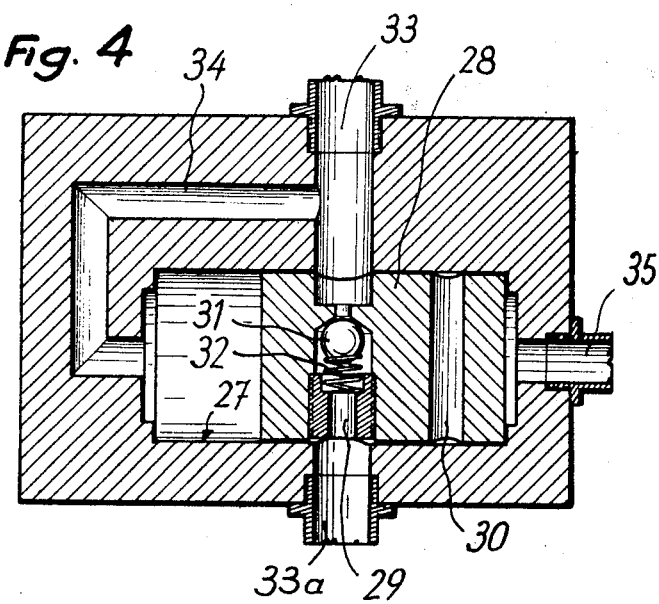

In order that the invention may be more clearly understood an embodiment of the invention will now be described, by way of example, with reference to the accompanying drawings, wherein:

FIGURE 1 is a side elevational view of a public works vehicle provided with stabilising stays according to the invention, FIGURE 2 is a diagram of the hydraulic system according to the invention for controlling the stays of the public works vehicles shown in FIGURE 1, FIGURE 3 is a diagrammatic section of a controlled non-return valve used in the hydraulic system and FIGURE 4 is a variant of the valve shown in FIGURE 3.

Referring first to FIGURE 1, the drawing shows a public works vehicle, of which the chassis 1 is supported on wheels 2 which may or may not be driving wheels. Stabilising stays 3 and 4 are pivotally mounted on the chassis 1 so as to be capable of being moved into engagement with the ground while the vehicle is in operation to increase the vehicle stability. The stays are controlled by hydraulic rams 101 and 102 disposed in an hydraulic system to be described hereinafter. In the example illustrated two groups of stabilising stays are provided consisting of two stays 3 at the front of the vehicle and two stays 4 at the rear, only one stay of each group being visible in the drawing.

Referring now to FIGURE 2, the hydraulic system comprises two groups of double-acting hydraulic rams 101 and 102 fed in parallel by a single pump 103 through a single reverser and distributor 104. The pump 103 feeds hydraulic fluid from a reservoir 105 and can return fluid back to the reservoir through the agency of a safety valve 106 calibrated to a pressure greater than that which is likely to be reached during normal operation.

Two main conduits 107 and 108 lead from the output of the distributor 104 and contain branch conduits 109 and 110 respectively leading one to each side of the piston in the cylinder of ram 101 and branch conduits 111 and 112 respectively leading to each side of the piston in the cylinder of ram 102.

The rams 101 and 102 are attached to the stays (not shown) and to simplify the drawing the latter shows only a single ram per group, the other rams of each group being fed in parallel to the arrangement illustrated by means of conduits 101a and 101b on the one hand and 102a and 102b on the other hand. The function of the conduit 102$a_1$ will be explained hereinafter. It will also be assumed that the retracted position of the rams corresponds to the retracted position of the stays.

Of course more than two groups of jacks could be provided, such other groups being fed by conduits 113 and 114. The conduit 110 of ram 101 contains two branch conduits 110a and 110b, the former containing a calibrated valve 115, hereinafter referred to as the main valve, which allows pressure fluid to flow only in the direction of supply of ram 101, while the branch 110b contains a non-return valve 116 acting in the opposite direction to the main valve 115.

Conduit 109 contains a controlled non-return valve 117, which will be described hereinafter in connection with FIGURES 3 and 4, but the control member of which communicates with the common outlet of the branch conduits 110a and 110b.

The conduit 111 feeding the ram 102 contains two branch conduits 111a and 111b respectively containing a main calibrated valve 118 and a non-return valve 119. A controlled non-return valve 120 similar to the valve 117 is disposed between the common outlet of the branch conduits 111a and 111b and the ram 102, the control member being connected to the conduit 112.

Finally, a branch conduit 121 is connected between the main conduit 108 and the common outlet of the branch conduits 111a and 111b and is provided with a calibrated valve 122 allowing the fluid to flow solely towards the conduit 108.

The calibration pressure of the valve 122 is greater than that of the valve 118, the sum of these two calibration pressures naturally being less than or at maximum equal to the pressure of the safety valve 106 of the pump. The calibration pressure of main valve 115 is also greater than that of the valve 118 and preferably about the same as that of valve 122.

Advantageously, each of the main conduits 107 and 108 contains safety valves 123 and 124 connected to the reservoir and calibrated to a pressure at least equal to that of the valve 106.

Referring now to FIGURE 3, a first embodiment of the controlled valve of the type denoted hereinbefore by references 117 and 120, is shown in greater detail. This valve comprises essentially a duct 20 containing a valve member 21 which is normally held on its seat 22 by a spring 23. Downstream of the valve member the duct 20 is denoted by reference 20a. A stem 24 extends opposite the valve member and one end is connected to a piston 25 sliding in a cylinder 26. In the system shown in FIGURE 2, the duct 20 is connected to the conduit 109 or to the common outlet of the branch conduit 111a and 111b, while the duct 20a is connected to the ram 101 or 102. The fluid admitted by the duct 20 can flow freely to the corresponding ram but its return is normally shut off by the valve member 21.

The cylinder 26 is connected to the common outlet of the branch conduits 110a and 110b or to the conduit 112.

If a pressure fluid (hereinafter referred to as the control pressure) is applied to the cylinder 26, the piston 25 and its rod 24 are moved to the left and lift the valve member 21. The ram control fluid can then flow from duct 20a to the duct 20. This will apply for movement of the rams 101 and 102 to the left, corresponding to retraction of the stays.

FIGURE 4 shows a variant of a controlled non-return valve. A slide member 28 moves in a cylinder 27 and has two ducts 29 and 30, the former containing a valve member 31 normally held on its seat by a spring 32. Two ducts 33 and 33a similar to the ducts 20 and 20a of the example shown in FIGURE 3, open out opposite one another and can be connected in the same way as before firstly to the conduit 109 or to the common outlet of the branch conduits 111a and 111b and, secondly, to the ram 101 or 102. A branch conduit 34 in the conduit 33 connects it to the left-hand end of the cylinder 27 while the conduit 35 leads out to the right-hand end of said cylinder.

When pressure fluid from the conduit 109 or 111 is applied to the conduit 33 and to the branch conduit 34, the slide member 28 is pushed to the right and the conduit 29 equipped with its valve member comes into register with the conduits 33 and 33a. The control fluid can then flow freely without any possible return from conduit 33 to conduit 33a and then to the corresponding ram.

When it is required to control the return, fluid under pressure is fed to the conduit 35, which moves the slide member to the left and brings the conduits 33a and 33 into free communication.

To explain the operation of the installation, it will be assumed that the various elements are initially in the positions shown in the drawing, the rams 101 and 102 being retracted and the distributor 104 being in the central neutral position as illustrated in FIGURE 2. Pump 103 then delivers directly to the reservoir.

If the slide member 104 is brought into the top position, the main conduit 107 is brought into communication with the pump 103 while the main conduit 108 is connected to the reservoir 105. The fluid feeds into the left-hand end of the cylinder of ram 101 through the branch conduit 109 and the controlled non-return valve 117 and is extended, while the main calibrated valve 118 temporarily prevents supply to the ram 102. When the ram 101 is fully extended, its piston abuts the right-hand end of the cylinder (and the stays attached to the ram 101 are in the operative position), so the fluid pressure in the circuit rides, and the main calibrated valve 118 is then pushed back and the ram 102 is supplied through the branch conduit 11 from the pump 103.

Of course the distributor 104 can be returned to its central position at any time during the movement of the ram 102, thus causing the latter to stop. This operation will generally be carried out because the movement of the rams 102 will be stopped when all the stays are in contact with the ground.

However, even if the ram 102 is not stopped, the force that it is required to transmit is limited by the calibrated valve 122 which allows fluid to return to the reservoir 105 when the pressure at the outlet of the branch conduits 111a and 111b exceeds a predetermined value.

The provision of the non-return valves 117 and 120 finally ensures the locking of the rams 101 and 102 even if the distributor 104 is brought to the central position, so that the pump 103 can be used for other operations.

If it is now required to retract the rams 101 and 102 for retraction of the stays, the distributor 104 is disposed in the bottom position, conduit 108 being connected to pump 103 and conduit 107 to reservoir 105.

In the first stage, as a result of the calibrated main valve 115, only the ram 102 is fed through conduit 112 and the controlled non-return valve 120. The pressure in the latter conduit acts on the piston 25 (FIGURE 3) or on the sliding member 28 (FIGURE 4) of the controlled non-return valve 120 and lifts the valve member 21 (FIGURE 3) or brings the conduit 30 into register with the two conduits 33 and 33a (FIGURE 4). The fluid contained in the left-hand end of the cylinder of ram 102 can then flow freely to the reservoir 105 through the conduit 111 and the branch conduit 111b. When the ram 102 is completely retracted, the pressure rises in the duct 108 and pushes back the calibrated main valve 115. Fluid is supplied to the right hand end of the cylinder of ram 101 and the pressure in the conduit 110 controls the opening of the controlled valve 117, thus allowing the left-hand end of the cylinder of ram 101 to empty. The movement of ram 101 continues until it has been completely retracted, when the distributor 104 can be returned to the central neutral position.

Of course the rams fed by the conduits 101a and 101b on the one hand, and 202a and 102b on the other hand, follow the same operating cycle as the rams 101 and 102.

However, it may be advantageous to provide more complex cycles than those described. To this end, one of the chambers of some of the rams of group 102 may be fed by conduit $102a_1$. On extension, the rams fed by this conduit move together with the ram 102 but retraction may be subjected to a controlled valve 120a similar to the valve 120 but controlled by a special element or by a hydraulic pressure other than that in the conduit 112.

What I claim is:

1. An hydraulic system for operating the extendable and contractible stabilising stays of a public works vehicle comprising at least two groups of stabilising stays attached to double-acting hydraulic rams, the rams of one group being fed in parallel and each group being arranged to be fed independently of the other from a single source of pressure fluid through a single distributor, wherein the supply conduit for the rams of one of the groups has two branch conduits, one of which is provided with a calibrated main valve which allows controlled supply of pressure fluid to said rams, while the other is provided with a non-return valve acting in the opposite direction to the calibrated main valve with which it is associated.

2. An hydraulic system according to claim 1, wherein the supply conduit for the rams of one group is provided with a controlled non-return valve allowing the rams to be supplied with pressure fluid only when no control is applied to it.

3. An hydraulic system according to claim 1, wherein the supply conduit for the rams of one group is provided with a controlled non-return valve situated between the calibrated main valve and the ram, said non-return valve allowing the ram to be supplied with pressure fluid only when no control is applied to it.

4. An hydraulic system according to claim 1, wherein the groups of rams are fed with pressure fluid in parallel via two main conduits arranged to be connected selectively to the source or pressure fluid, the conduit supplying the rams of at least one of the groups being connected to one of the main conduits, while the conduit supplying the rams of another group is connected to the other main conduit.

5. An hydraulic system according to claim 1, wherein the calibrated main valves associated with the rams fed respectively via each of the main supply conduits are set to different operating pressures.

6. An hydraulic system according to claim 4, wherein a branch conduit is provided between the rams of one group fed by a main conduit and the associated main valve of the said rams, the said branch conduit being connected to the second main conduit, said branch conduit containing a valve calibrated to a pressure greater than that of the said main valve and allowing fluid to pass only in the direction of the second main conduit.

7. A method of operating extendable and contractible stabilising stays of a public works or handling vehicle, where at least two groups of stays are arranged to bear on the ground and preferably disposed at each of the ends of the vehicle, the method consisting in first extending the stays of one of the groups until they are fully extended, then extending the stays of the other group in response to the completion of extending movement of said one group and stopping their movement in the position corresponding to the position in which all of the stays of the various groups bear on the ground, retracting being effected in reverse sequence to extension with the retraction of said one group being initiated in response to the completion of retraction of the other group.

References Cited

UNITED STATES PATENTS

| 2,244,894 | 6/1941 | Parker. |
| 3,015,497 | 1/1962 | Aldred. |

FOREIGN PATENTS

| 581,990 | 8/1959 | Canada. |
| 835,190 | 3/1952 | Germany. |

BENJAMIN HERSH, *Primary Examiner.*

J. E. SIEGEL, *Assistant Examiner.*

U.S. Cl. X.R.

60—52